(12) United States Patent
Raybould et al.

(10) Patent No.: US 7,455,881 B2
(45) Date of Patent: Nov. 25, 2008

(54) METHODS FOR COATING A MAGNESIUM COMPONENT

(75) Inventors: Derek Raybould, Denville, NJ (US);
Murali N. Madhava, Gilbert, AZ (US);
Vincent Chung, Tempe, AZ (US);
Timothy R. Duffy, Chandler, AZ (US);
Margaret Floyd, Chandler, AZ (US)

(73) Assignee: Honeywell International Inc., Morristown, NJ (US)

( * ) Notice: Subject to any disclaimer, the term of this patent is extended or adjusted under 35 U.S.C. 154(b) by 358 days.

(21) Appl. No.: 11/114,470

(22) Filed: Apr. 25, 2005

(65) Prior Publication Data

US 2006/0240192 A1    Oct. 26, 2006

(51) Int. Cl.
*B05D 1/02*    (2006.01)
(52) U.S. Cl. .................. 427/203; 427/191; 427/192; 427/205
(58) Field of Classification Search ............. 427/140, 427/191, 192, 203, 205
See application file for complete search history.

(56) References Cited

U.S. PATENT DOCUMENTS

| | | | |
|---|---|---|---|
| 3,753,668 A | 8/1973 | Flicker | |
| 3,754,976 A * | 8/1973 | Babecki et al. | 427/192 |
| 4,552,784 A | 11/1985 | Chu et al. | |
| 5,302,414 A | 4/1994 | Alkhimov et al. | |
| 5,972,424 A * | 10/1999 | Draghi et al. | 427/142 |
| 6,139,913 A | 10/2000 | Van Steenkiste et al. | |
| 6,464,933 B1 | 10/2002 | Popoola et al. | |
| 6,569,245 B2 | 5/2003 | Krysa et al. | |
| 6,582,200 B2 | 6/2003 | Kato et al. | |
| 6,592,947 B1 | 7/2003 | McCane et al. | |
| 2003/0219542 A1 | 11/2003 | Ewasyshyn et al. | |
| 2006/0134320 A1 * | 6/2006 | DeBiccari et al. | 427/140 |

FOREIGN PATENT DOCUMENTS

| | | |
|---|---|---|
| DE | 10359046 A1 | 7/2005 |
| EP | 484 533 | * 12/1991 |

(Continued)

OTHER PUBLICATIONS

Experimental Study of titanium/aluminum Deposits Produced by Cold Gas Dynamic Spray, Novoselova et al "surface and Coatings Technology", pp. 2275-2783, available online Dec. 22, 2004.*

(Continued)

*Primary Examiner*—Frederick J Parker
(74) *Attorney, Agent, or Firm*—Ingrassia, Fisher & Lorenz, P.C.

(57) ABSTRACT

The present invention provides methods and materials for use in applying a coating on a surface of a magnesium component. The method includes the steps of: accelerating a coating powder to a velocity of between about 500 to about 1200 meters/second, wherein the coating powder comprises a material selected from the group consisting of aluminum, aluminum alloys, titanium, titanium alloys, and composites; directing the coating powder through a convergent-divergent nozzle onto the surface of the magnesium component; and forming a coating on the surface of the magnesium component so as to substantially cover the surface of the magnesium component. The coating thickness may be between approximately 0.1 to approximately 1.0 mm.

12 Claims, 4 Drawing Sheets

FOREIGN PATENT DOCUMENTS

| EP | 0 484 533 | * | 5/1992 |
|---|---|---|---|
| RU | 2038411 | * | 11/1993 |
| WO | WO 00/52228 | | 9/2000 |
| WO | WO 9829580 A1 | | 8/2002 |

OTHER PUBLICATIONS http://en.wikipedia.org Definition of AA6061.*

Amateau et al IMAST Quarterly No. 2, 2000 pp. 3-6.*

"A method of "cold" gas-dynamic deposition" Alkhimov et al Sov. Phys. Dokl. 35 (12) Dec. 1990. pp. 1047-1049.*

Novoselova et al , Surface & Coating Technology, pp. 2775-2783 (2006).*

PCT International Search.

Report PCT/US2006/010833, filed Sep. 29, 2006.

Duffy, L., Magnesium Alloys—Zirconium Free Casting Alloys, Material Worlds, vol. 4, 1996, p. 127-130.

Novoselova, T., et al., Experimental study of titanium/aluminum deposits produced by cold gas dynamic spray, Surface and Coatings Technology, vol. 200,No. 8 Dec. 22, 2004.

Barradas, R., Application of laser shock adhesion testing to the study of the interlamellar strength . . . Surface and Coatings Technology,vol. 197 Oct. 27, 2004 pp. 18-27.

* cited by examiner

METHODS FOR COATING A MAGNESIUM COMPONENT

FIELD OF THE INVENTION

The present invention relates to repairs on surfaces of magnesium components, and more particularly to the build up of coatings on surfaces of magnesium components.

BACKGROUND OF THE INVENTION

Magnesium has the advantage of being light weight and readily castable to complex forms. Thus, it would seemingly be a desirable material to use for aerospace applications. However, magnesium suffers from the disadvantage of being prone to corrosion. Corrosion of magnesium may produce corrosion pits, which can be deep and difficult to repair. Further, upon exposure to air above room temperature and at relatively low but elevated temperatures, magnesium may burn. For at least these reasons the use of magnesium in aerospace applications has been limited.

Various means have been proposed to address the above-noted disadvantages. For example, it has been proposed to cover magnesium components with coatings and/or paints as a way to improve corrosion protection for magnesium. However, coatings and paints can, in some instances, be relatively easily scratched. Moreover, a magnesium substrate with a coating may set up an electrical cell if the coating does get scratched, which can subsequently lead to rapid corrosion of the magnesium exposed by the scratch.

Magnesium is also susceptible to erosion and wear. Both these processes remove material that must be replaced during a repair. Otherwise the part may need to be scrapped. Thermal spray techniques employing other metals and materials have been used with other metals as a method to replace eroded material. However, thermal spraying is not well suited for use with magnesium. The temperatures involved to melt and bond the deposited metal in thermal spraying techniques can result in burning of the magnesium.

Aluminum has a low melting point and might thereof be considered a material that could be thermally sprayed to repair magnesium. However, there are problems in thermal spraying aluminum because it is prone to oxidation forming a tenacious oxide film. Even if it was possible to easily thermally spray aluminum, the phase diagram shows that it forms an intermetallic with magnesium at temperatures of approximately 450° C. and has significant solid solubility in magnesium. Thus, heretofore aluminum has not been considered a likely candidate for use in repairing magnesium.

Hence there is an ongoing need to provide protection for magnesium substrates against both corrosion and erosion. It is desired that these protective methods be stable and durable so as to avoid scratching. There is also a need to be able to repair corrosion pits and build up material lost to wear and erosion in magnesium parts. It is further desired to develop methods to apply these magnesium repair techniques on surfaces of cast magnesium parts used in aerospace applications such as those found in helicopter components. The present invention addresses one or more of these needs.

SUMMARY OF THE INVENTION

The present invention provides an apparatus and methods for use in repair of magnesium components. In one embodiment, and by way of example only, there is provided a method of applying a coating on a surface of a magnesium component that includes the steps of: accelerating a coating powder to a velocity of between about 500 to about 1200 meters/second, wherein the coating powder comprises a material selected from the group consisting of aluminum, aluminum alloys, titanium, titanium alloys, and hard particle dispersed composites and combinations thereof; directing the coating powder through a convergent-divergent nozzle onto the surface of the magnesium component; and forming a coating on the surface of the magnesium component so as to substantially cover the surface of the magnesium component. The step of forming a coating may include forming the coating with a thickness of between approximately 0.1 to approximately 1.0 mm. The method may also include the step of heating the coating powder to a temperature of between about 250° F. to about 750° F. The coating powder in the method may have a particle size (diameter) of between about 5 to about 50 microns. The method may also include the step of providing coating powder at a powder feed rate of about 0.01 to about 20 grams/second-cm$^2$. The method may also include the step of preparing the surface of the magnesium component by an operation comprising a method selected from the group consisting of grinding, degreasing, and grit blasting. The method may also include the step of heat treating the coating and magnesium substrate. The method may also include the step of depositing the powder composition on the component surface in more than one layer through a series of more than one deposition steps.

In a further embodiment, and still by way of example, there is provided a method for providing corrosion and erosion protection to a surface of a magnesium component comprising the steps of: providing a magnesium component with a surface; inspecting the magnesium component for suitability for high velocity cold spraying; preparing the surface of the magnesium component by an operation comprising a method selected from the group consisting of: machining, degreasing, and grit blasting; and applying a coating onto the surface of the magnesium component by high velocity cold spraying so as to substantially cover the surface of the magnesium component with the coating, thereby providing corrosion and erosion protection to the surface of the magnesium component. The step of applying a coating onto the surface of the magnesium component may include applying a first powder material onto the surface of the magnesium component so as to form a first coating layer, checking material build-up of the first coating layer, and applying a second powder material onto the first coating layer so as to form a second coating layer. The first powder material may be different from the second powder material. The step of applying a coating onto the surface of the magnesium component may include applying a first powder material onto a first surface area of the magnesium component and applying a second powder material onto a second surface area of the magnesium component. The first powder material may be different from the second powder material. The method may also include the step of heat treating the coated component, and heat treating the coated component may comprise heating the coated component at approximately 600° F. to approximately 725° F. for approximately 0.5 to approximately 2 hours, cooling the coated component, and then heating the coated component to approximately 250° F. to approximately 425° F. for approximately 4 to approximately 16 hours. The method may also include inspecting the component by x-ray inspection or FPI inspection.

In a further embodiment, still by way of example, there is provided a coated component comprising: a magnesium substrate having a surface; and a coating deposited on the surface of the magnesium substrate wherein the coating comprises a material selected from the group consisting of aluminum, aluminum alloys, titanium, titanium alloys, iron, iron alloys, copper, copper alloys, nickel, nickel alloys, and composites; and wherein the coating substantially covers the surface of the magnesium substrate. The coating and the magnesium substrate may be part of a helicopter gear box covering or a helicopter generator housing. The coating may have a first layer comprising a first material and a second layer comprising a second material. The surface of the magnesium substrate may have a first surface area and a second surface area, and in such case the coating may have a first coating comprising a first material deposited on the first surface area and a second coating comprising a second material deposited on the second surface area.

Other independent features and advantages of the method to provide magnesium repair and build up will become apparent from the following detailed description, taken in conjunction with the accompanying drawings which illustrate, by way of example, the principles of the invention.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention. Reference will now be made in detail to exemplary embodiments of the invention, examples of which are illustrated in the accompanying drawings. Wherever possible, the same reference numbers will be used throughout the drawings to refer to the same or like parts.

Figure 1:
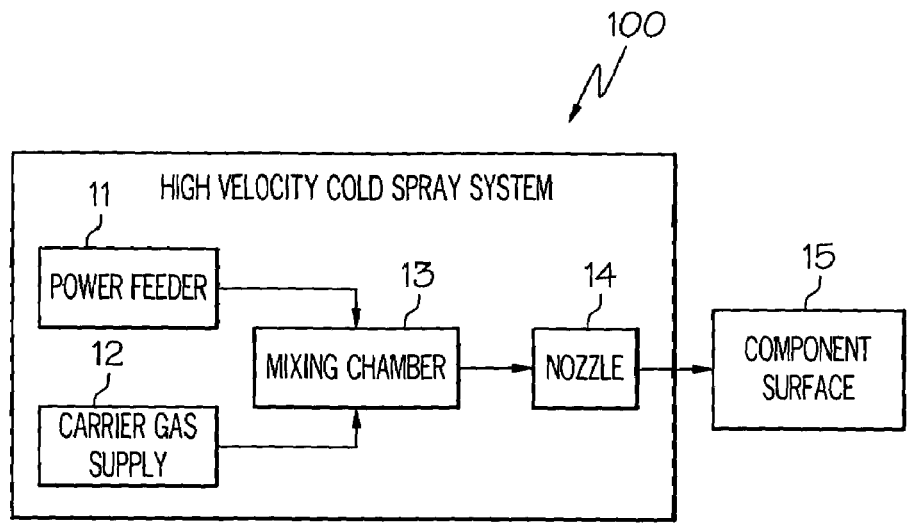
FIG. 1 is a diagrammatic representation of the equipment and apparatus that may be used to perform high velocity cold spraying of materials in accordance with an embodiment of the present invention.

In a preferred method, a powder of a protective coating composition is deposited onto a surface of a magnesium substrate through a high velocity cold spraying process. The deposition forms a protective coating that protects the magnesium substrate from forces such as wear, erosion, and corrosion. Referring now to FIG. 1 there is shown an exemplary spray system 10 illustrated diagrammatically. The system 10 is illustrated as a general scheme, and additional features and components can be implemented into the system 10 as necessary. The main components of the spraying system 10 include a powder feeder 11 for providing repair powder materials, a carrier gas supply 12 (typically including a heater), a mixing chamber 13 and a convergent-divergent nozzle 14. In general, the system 10 mixes the coating particles with a suitable pressurized gas in the mixing chamber 13. The particles are accelerated through the specially designed nozzle 14 and directed toward a component surface 15. When the particles strike the component surface 15, converted kinetic energy causes plastic deformation of the particles, which in turn causes the particles to form a bond with the component surface 15. Thus, the high velocity cold spray system 10 can bond powder materials to the component surface 15.

The high velocity cold spray process may be referred to as a "cold gas" process because the particles are mixed and applied at a temperature that is far below the melting point of the particles. The kinetic energy of the particles on impact with the component surface 15, rather than particle temperature, causes the particles to plastically deform and bond with the component surface 15. Therefore, bonding to the component surface 15 takes place as a solid state process with insufficient thermal energy to transition the solid powders to molten droplets. Typically, prior to spraying the powder is heated to an average temperature of between approximately 250° F. to approximately 750° F. However, during and after spraying the average temperature rise of the powder and magnesium substrate is less than 100° C.

A variety of different systems and implementations can be used to perform the high velocity cold spraying process. For example, U.S. Pat. No. 5,302,414, entitled "Gas Dynamic Spraying Method for Applying a Coating" and incorporated herein by reference, describes an apparatus designed to accelerate materials having a particle size diameter of between about 5 to about 50 microns, and to mix the particles with a process gas to provide the particles with a density of mass flow between about 0.01 and about 20 $g/s\text{-}cm^2$. In other embodiments, a more focused range of mass flow may be about 0.1 to about 1 $g/s\text{-}cm^2$. Supersonic velocity is imparted to the gas flow, with the jet formed at high density and low temperature using a predetermined profile. The resulting gas and powder mixture is introduced into the supersonic jet to impart sufficient acceleration to ensure a particle velocity ranging between about 500 and about 1200 m/s. In this method, the particles are applied and deposited in the solid state, i.e., at a temperature that is considerably lower than the melting point of the powder material and of the substrate. The resulting coating is formed by the impact and kinetic energy of the particles which gets converted to high-speed plastic deformation, causing the particles to bond to the surface. The system typically uses gas pressures of between 5 and 20 atm. As non limiting examples, the gases can comprise air, nitrogen, helium and mixtures thereof. Again, this system is but one example of the type of system that can be adapted to cold spray powder materials to the target surface.

A high velocity spraying system may be adapted for various materials. With respect to coatings on magnesium, it is preferred to use aluminum, titanium, or alloys thereof as the coating. Iron, nickel, copper, and alloys thereof may also be used to coat magnesium. Other materials that may be used as materials to produce a coating on aluminum include alloys of AlMg, alloys of AlSi, and mixtures of Al alloys with ceramic particles.

AlMg and AlSi alloys provide good corrosion resistance, provided impurity levels are controlled. These alloys also have sufficient strength and hardness to also provide erosion and wear resistance. Alloys of aluminum with inert ceramic particles can also provide good corrosion, erosion, and wear resistance. In general these alloys are not prone to form galvanic cells with the magnesium and so there is no need to cover the entire part. In addition, for duplex coatings these alloys should be used as a first base layer over which the other coatings are applied in order to reduce the possibility of setting up a galvanic cell.

Coatings with aluminum, titanium, their alloys, and composites containing hard particles of these metals provide a relatively hard coating that isolates the magnesium substrate. These coatings protect the magnesium material from degrading forces of wear, erosion, and corrosion. It is thus preferred that a coating substantially cover the substrate area where it is desired to provide protection. Voids and pin holes that expose the magnesium substrate are to be avoided. A coating with a thickness on the order of approximately 0.1 to 1.0 mm provides a significant degree of protection without significant weight increase to the component.

Material build up to repair corrosion and erosion pits in magnesium may still be significantly greater, even on the order of 10 to 20 mm in thickness. Such a thick deposition can be achieved according to the present invention partly because of the low average temperature rise. Such a thick repair is not feasible with thermal spray techniques.

Process parameters for the high velocity cold spray process can be varied depending on the repair material to be used. Examples of parameters that may be controlled include particle velocity, particle size, and particle preheat. With respect to the titanium and aluminum materials, titanium has a higher density than aluminum. At a given velocity, titanium will have a higher momentum than aluminum. However, in order to build-up coating deposits through high velocity cold spray process, a threshold critical velocity has to be exceeded; this is true for aluminum, titanium, and any other material. Although the higher density of titanium allows for a somewhat lowered critical velocity, other factors such as material strength and melting temperature also considerably affect the critical velocity. Hence, the estimated critical velocities for aluminum and titanium are somewhat similar, with a theoretical value of approximately 650 m/sec. A high velocity cold spray process would want to set a minimum velocity slightly above this number. Thus, to achieve good bonding with the magnesium substrate, it is possible to deposit titanium and aluminum powders when the particle velocities exceed 700 m/sec. Particle size also affects momentum. As particle size increases, it is generally necessary to increase the particle velocity.

The parameters of the high velocity cold spraying system are preferably balanced so as to achieve a good bonding between the particles and the substrate, yet without unduly damaging or gritting the substrate. The spraying process presents a potentially destructive force in the powder spray directed against the magnesium substrate. Additionally, the spraying process can produce a gritting effect on the substrate if the powder spray is directed against the magnesium substrate with particle velocities lower than the critical velocity. Cast magnesium structures as used in helicopter applications are relatively brittle. Application of inappropriate velocities can stress and crack the magnesium. Thus, to promote plastic deformation the process parameters of process gas and its temperature as well as inlet pressure, particle size, velocity, and particle temperature may be varied to form cold spray deposits. For aluminum, with helium as the process gas an exemplary range of parameters is about 5 to about 20 microns for the particle size range, particle velocities of about 500 m/sec to about 1200 m/sec. If the process gas is changed the parameters also necessarily change to meet the boundary conditions of cold spray deposit formation. For titanium deposition the parameters are similar, however, higher particle temperatures/higher velocities as compared to aluminum are advantageous to compensate for its inherent reduced plastic deformation behavior.

Figure 2:
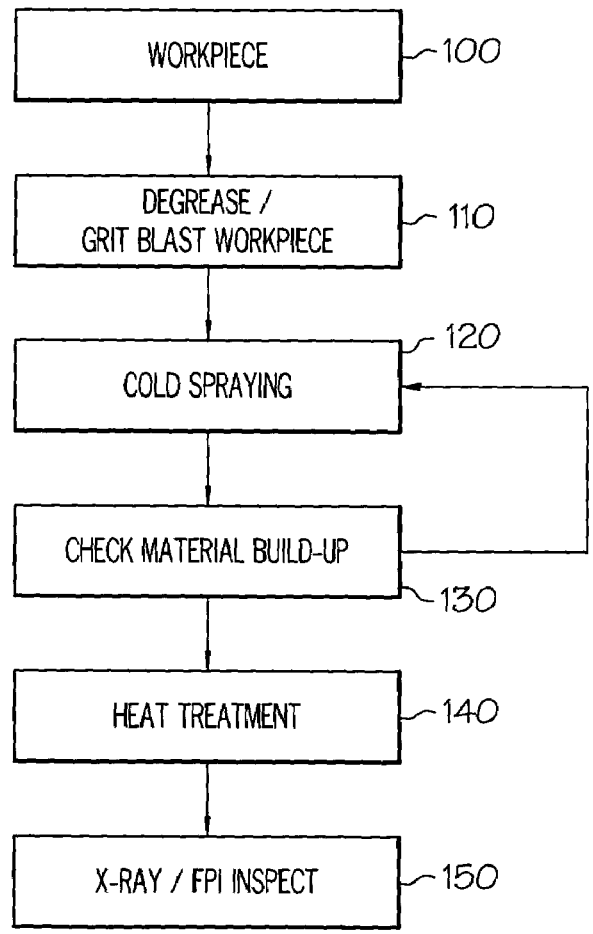
FIG. 2 is an illustration of aluminum particles impinging on a surface of a magnesium substrate, according to an embodiment of the present invention.

Referring now to FIG. 2 there is shown a perspective view of coating particles 21 being deposited on a magnesium substrate 22. Particles 21 that have impacted the surface 23 of magnesium substrate 22 are represented in a deformed, irregular shape, thus indicating the deformation that occurs when the particles contact the substrate. In contrast, the particles 21 that have not yet impacted the substrate, but which are being directed toward the surface of magnesium substrate, are still in a generally original spherical shape. All of the powder particles 21 are generally not perfectly spherical, and FIG. 2 thus represents an approximation of the particle shape. It is further noted in FIG. 2 that particles 21 have not yet covered the entire exposed surface 23 of magnesium substrate 22. In a preferred embodiment, deposition continues until particles 21 substantially cover the surface 23. In this manner magnesium in the substrate is isolated from exposure to the environment. Substantial coverage of the substrate, it will be appreciated, signifies a degree of coverage sufficient to protect the substrate from corrosion and erosion. Substantial coverage is also associated with the significant absence of pinholes or voids that expose the covered surface of the magnesium substrate to the environment beyond the coating.

Figure 3:
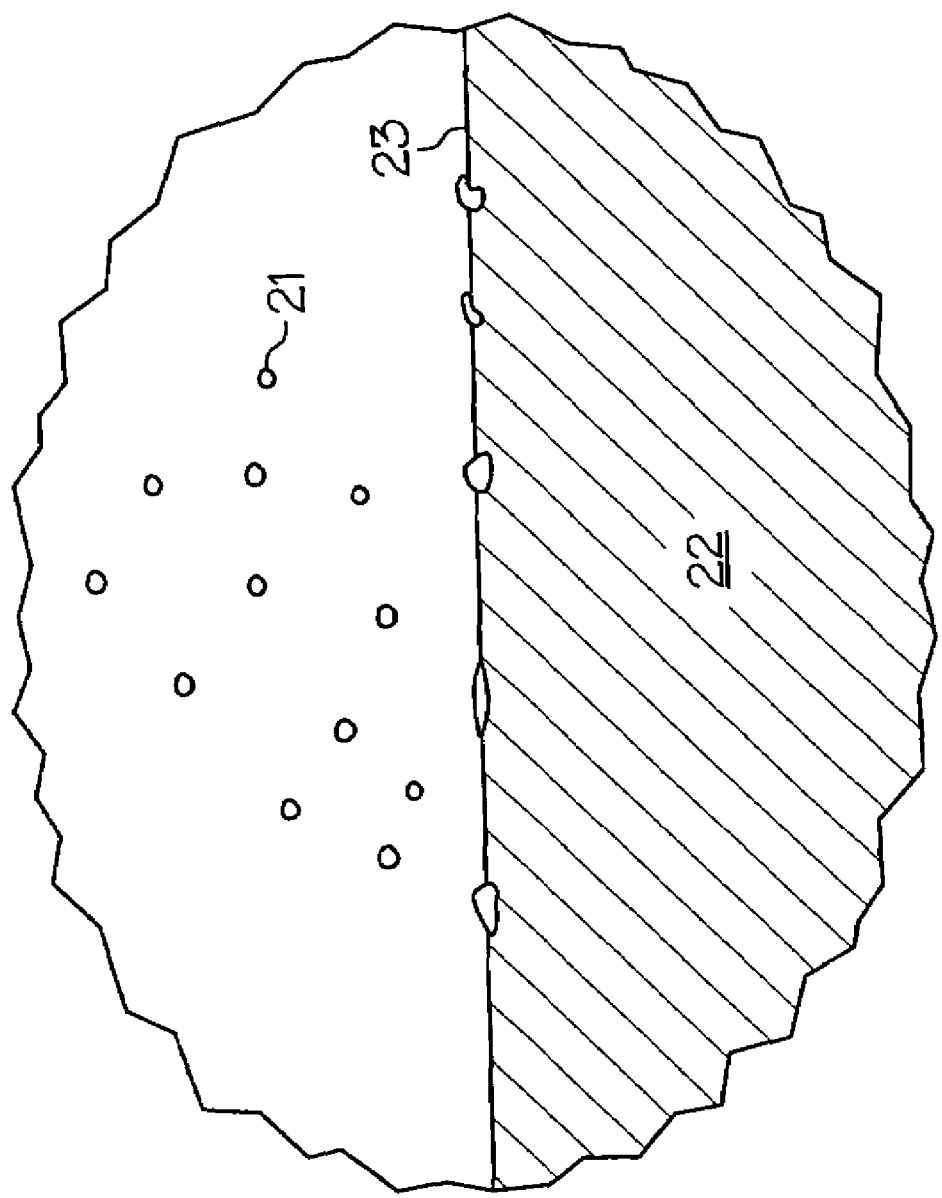
FIG. 3 is a flow chart illustrating steps in a method of making repairs to an eroded magnesium substrate according to an embodiment of the present invention.

Referring now to FIG. 3, one embodiment of the spraying method is shown in flowchart form. This method includes the high velocity cold spray process, and also includes additional optional processes to optimize the resulting repairs. High velocity cold spray involves "solid state" processes to effect bonding and coating build-up, and does not rely on the application of external thermal energy for bonding to occur during spraying operation. However, additional processing may be implemented to optimize bonding within the material and many thermo-mechanical properties for the material such as the elastic/plastic properties, mechanical properties, thermal conductivity and thermal expansion properties. In the method additional optional processing includes heat treatments to consolidate and homogenize the applied material and to restore metallurgical integrity to the repaired component.

A suitable workpiece is first identified in step 100. Inspection of the workpiece confirms that the workpiece is a suitable candidate for repair according to embodiments of the present invention. The workpiece should not suffer from mechanical defects or other damage that would disqualify it from service, after receiving the coating treatment.

Step 110 reflects that the workpiece may be subjected to a pre-processing treatment to prepare the piece for receiving a material deposition in further steps. In one embodiment a surface of the component/workpiece receives a pre-treatment machining and/or degreasing in order to remove materials that interfere with cold spraying such as corrosion, impurity buildups, and contamination on the face of the workpiece. In addition the piece may receive a grit blasting with an abrasive such as aluminum oxide. In a further embodiment the method includes the step of shot or grit blasting the surface of the substrate prior to coating to create a rough surface.

After these preparatory steps, deposition of coating material commences in step 120 through high velocity cold spraying. In high velocity cold spraying, particles at a temperature below their melting temperature are accelerated and directed to a target surface on the component. When the particles strike the target surface, the kinetic energy of the particles is converted into plastic deformation of the particle, causing the particle to form a strong bond with the target surface.

The deposition of a coating layer through high velocity cold spraying may occur over several deposition cycles. For example, after a first pass takes place 120, the coating thickness of the first layer is checked 130. If the build-up of material is below a minimum, a second pass occurs 120 on top of the first layer. The thickness of material deposited is then checked again 130. In this manner a series of material deposition steps 120, 130 are repeated, as necessary or desired. Thus a series of spraying passes can build up a desired thickness of newly deposited material. Likewise, a series of spraying passes may be implemented in order to cover a desired surface area with subsequent spraying passes depositing material adjacent to coatings from earlier spraying passes. A series of spraying passes also advantageously provides thorough coverage of the coating over a desired substrate area. Multiple passes further help to avoid pin holes or other voids that expose the magnesium substrate to the environment.

In one embodiment, the additional layers deposited over a first layer in a coating may be of a different metal or alloy than the first layer. In this manner coatings are developed so that different laminates or layers of material may have different compositions. In one embodiment, a first layer of aluminum, aluminum alloy, or aluminum composite is deposited, and a second layer of titanium or titanium alloy is deposited over the underlying aluminum layer. The composition of each laminate may be selected so as to provide desired physical and metallurgical characteristics for the coating. For example, an outer titanium layer provides a relatively high degree of toughness, an outer layer of nickel provides a relatively high degree of wear resistance, and a layer of aluminum provides advantageous corrosion and weight characteristics.

In addition to varying the composition of the laminates in a particular coating, a coating may also be tailored to suit the needs of particular areas on the overall component surface. Areas in need of wear resistance may include coatings with nickel; areas needing toughness may include coatings with titanium. Areas without a need for toughness or wear resistance may be coated with aluminum. Thus, a component may be coated with one kind of coating in one area and with a different coating in another area. Care, however, must be taken to avoid forming galvanic cells. Coating all surfaces of the part and the use of alloys such as AlMg or AlSi minimizes that risk.

Next, an optional heat treatment 140 may be performed on the coated component. The heat treatment, when performed above recrystallization temperature, can provide a degree of crystal growth, if desired. An exemplary heat treatment for aluminum deposited on a magnesium substrate includes 1) a homogenizing treatment in the range of about 600° F. to about 725° F. for about 0.5 hours to about 2 hours in duration, and 2) a precipitation/aging treatment in the range of about 250° F. to about 425° F. for about 4 to about 16 hours in duration. The lower time limits in this heat treatment example are generally preferred when the higher temperatures are employed in the homogenization and the precipitation heat treatments. However, when other materials, such as titanium, are sprayed, temperatures higher than those mentioned may be used while taking into consideration the characteristics of magnesium base alloy materials.

Finally, an FPI (Fluorescent Penetration Inspection) procedure, as well as an x-ray inspection 150 may follow on the refurbished component. At this time the component may be returned to service, or placed in service for the first time.

Figure 4:
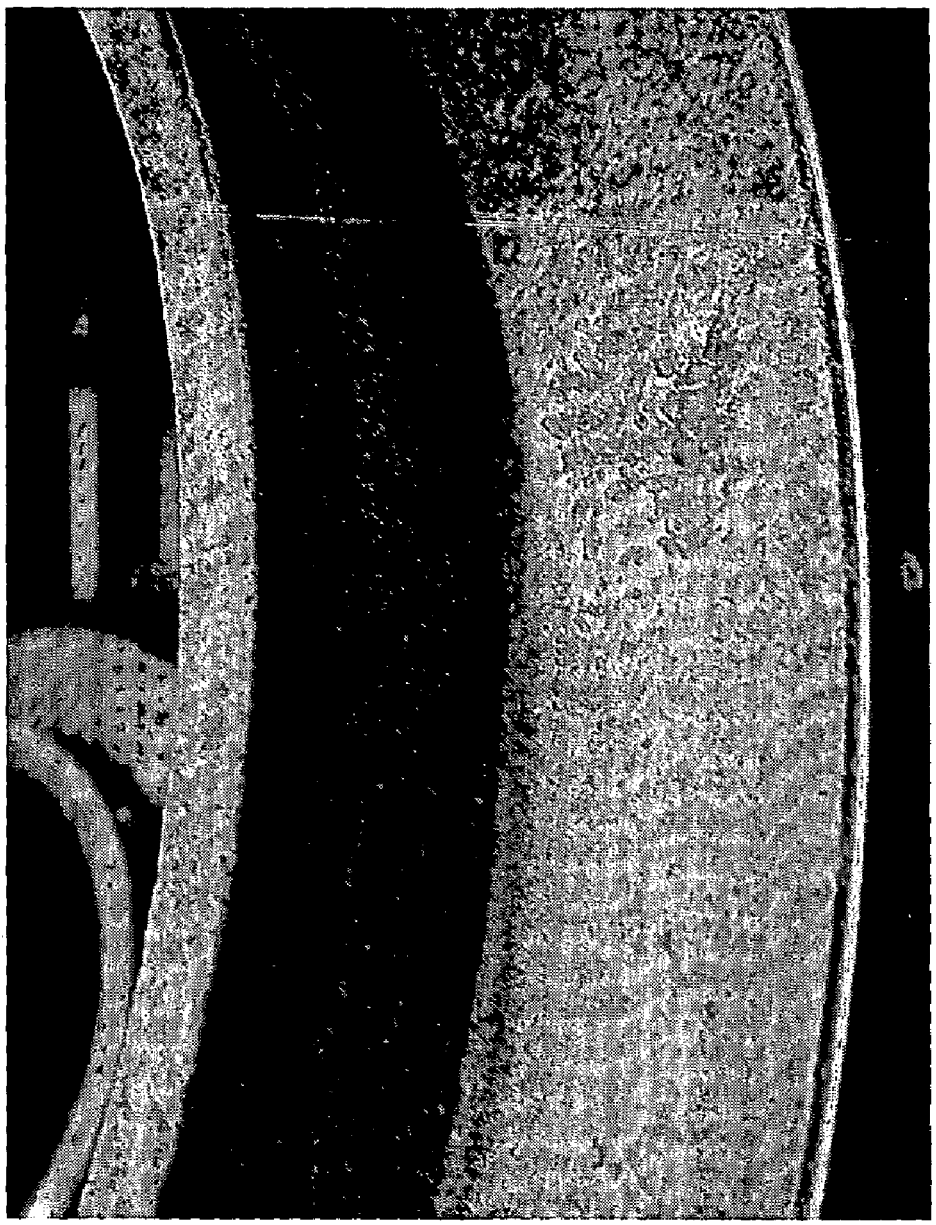
FIG. 4 is an illustration of a surface of a magnesium component, prior to coating, showing corrosion and pitting.
Figure 5:
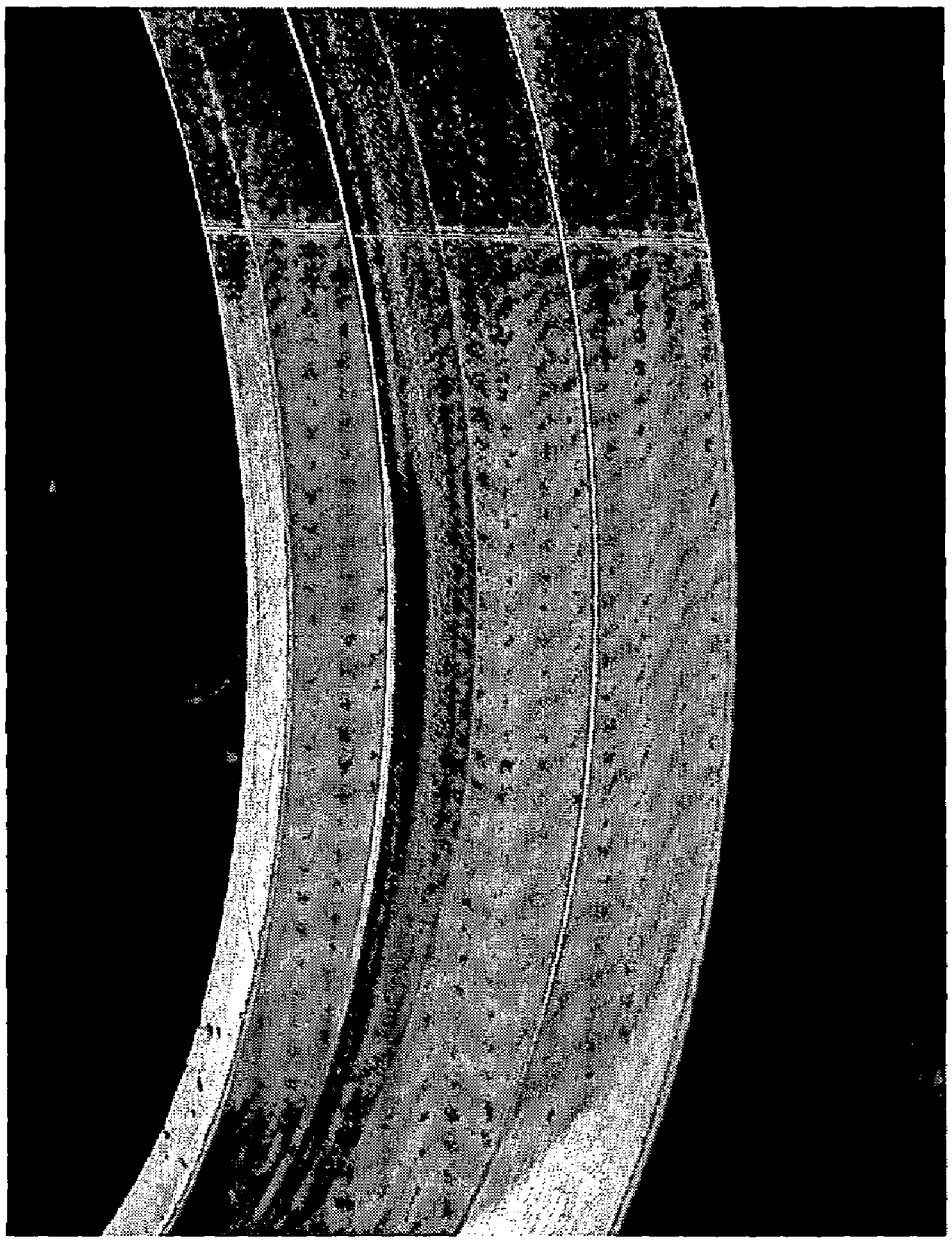
FIG. 5 is an illustration of the surface of the magnesium component of FIG. 4 after repair coating according to an embodiment of the present invention.

Referring now to FIG. 4 and FIG. 5 there are shown magnesium components before and after a repair according to an embodiment of the present invention. FIG. 4 illustrates a surface 41 of a magnesium component. Surface 41 displays the depressions and roughness associated with magnesium corrosion and pitting. Pits and corrosion that may be repaired may have a depth of up to approximately 20 mm from the original surface of the component. Alternatively, corrosion and pitting may be repaired that has a thickness of up to approximately half the thickness of the original component. FIG. 5 shows the same component after a repair according to an embodiment described herein. In FIG. 5 surface 41 displays a smooth and finished appearance, and the previous pitting and roughness are absent. The ability to repair deep pits is an advantage of the process described. The restored component in FIG. 5 is in a condition to return to service.

While the high velocity coating process may be used with many kinds of substrates, it finds particular application with respect to magnesium substrates. One preferred embodiment entails restoring surfaces of magnesium gear boxes, generator housings, and other components. Examples of such magnesium structures are found in helicopter components.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of applying a coating on a surface of a magnesium component, the method comprising the steps of:
   accelerating a coating powder to a velocity of between about 500 to about 1200 meters/second and directing the coating powder through a convergent-divergent nozzle onto the surface of the magnesium component to form a layer of aluminum thereover; and
   depositing additional coating materials over the layer of aluminum by accelerating the additional coating materials to a velocity of between about 500 to about 1200 meters/second and directing the additional coating materials through the convergent-divergent nozzle over the layer of aluminum forming a laminate on the surface of the magnesium component so as to substantially cover the surface of the magnesium component, the laminate having an outer layer of titanium.

2. The method according to claim 1 wherein the coating is up to approximately 20 mm in thickness.

3. The method according to claim 1 further comprising the step of heating the coating powder to a temperature of between about 250° F. and about 750° F.

4. The method according to claim 1 farther comprising the step of providing coating powder at a powder feed rate of about 0.01 to about 20 grams/second-cm$^2$, before the step of accelerating.

5. The method according to claim 1 farther comprising the step of preparing the surface of the magnesium component by an operation comprising a method selected from the group consisting of grinding, degreasing, and grit blasting.

6. The method according to claim 1 wherein the step of accelerating a coating powder further comprises accelerating a coating powder with a gas comprising helium.

7. A method for coating a surface of a magnesium component comprising the steps of:
   providing a magnesium component with a surface;
   inspecting the magnesium component for suitability for cold spraying;
   preparing the surface of the magnesium component; and
   applying a coating onto the surface of the magnesium component by cold spraying so as to substantially cover the surface of the magnesium component with the coating, the coating comprising a laminate including a layer of aluminum over the magnesium component and an outer layer of titanium over the layer of aluminum.

8. The method according to claim 7 wherein the step of applying a coating onto the surface of the magnesium component produces a coated component, and further comprising heat treating the coated component wherein the step of heat treating the coated component comprises heating the coated component at approximately 600° F. to approximately 725° F. for approximately 0.5 to approximately 2 hours, cooling the coated component, and then heating the coated component to approximately 250° F. to approximately 425° F. for approximately 4 to approximately 16 hours.

9. The method according to claim 7 further comprising inspecting the coated component by x-ray inspection or FPI inspection.

10. A method of applying a coating on a surface of a magnesium component, the method comprising the steps of:

accelerating a coating powder to a velocity of between about 500 to about 1200 meters/second and directing the coating powder through a convergent-divergent nozzle onto the surface of the magnesium component to form a layer of aluminum thereover; and depositing additional coating materials over the layer of aluminum by accelerating the additional coating materials to a velocity of between about 500 to about 1200 meters/second and directing the additional coating materials through the convergent-divergent nozzle over the layer of aluminum forming a laminate on the surface of the magnesium component so as to substantially cover the surface of the magnesium component, the laminate having an outer layer of a material selected from the group consisting of titanium, titanium alloys, iron, iron alloys, copper, copper alloys, nickel, nickel alloys, and composites.

11. The method according to claim 10 wherein the coating is up to approximately 20 mm in thickness.

12. The method according to claim 10 further comprising the step of heating the coating powder to a temperature of between about 250° F. and about 750° F.

* * * * *

UNITED STATES PATENT AND TRADEMARK OFFICE
CERTIFICATE OF CORRECTION

PATENT NO. : 7,455,881 B2  
APPLICATION NO. : 11/114470  
DATED : November 25, 2008  
INVENTOR(S) : Derek Raybould et al.

Page 1 of 1

It is certified that error appears in the above-identified patent and that said Letters Patent is hereby corrected as shown below:

Column 8, line 47, "farther" should be changed to --further--;  
Column 8, line 51, "farther" should be changed to --further--.

Signed and Sealed this

Seventeenth Day of February, 2009

JOHN DOLL  
*Acting Director of the United States Patent and Trademark Office*